United States Patent [19]
Allen

[11] Patent Number: 5,922,995
[45] Date of Patent: *Jul. 13, 1999

[54] PARTITIONING DEVICE FOR A TUBULAR CONDUIT AND METHOD OF INSTALLATION THEREOF

[75] Inventor: Jerry L. Allen, Westfield Center, Ohio

[73] Assignee: Vikimatic Sales, Inc., Wadsworth, Ohio

[*] Notice: This patent is subject to a terminal disclaimer.

[21] Appl. No.: 08/482,443

[22] Filed: Jun. 7, 1995

Related U.S. Application Data

[60] Continuation-in-part of application No. 08/136,167, Oct. 15, 1993, Pat. No. 5,442,136, which is a division of application No. 07/907,594, Jul. 2, 1992, abandoned.

[51] Int. Cl.$^6$ ..................................................... H02G 3/28
[52] U.S. Cl. .................. 174/95; 174/68.1; 174/99 R; 174/98; 254/134.3 FT
[58] Field of Search ................ 174/68.1, 95, 99 R, 174/97, 70 C, 96, 98, 101, 28, 29; 254/134.3 R, 134.4, 134.3 FT, 134.3 SC, 134.3 CL

[56] References Cited

U.S. PATENT DOCUMENTS

| | | | |
|---|---|---|---|
| 2,566,335 | 9/1951 | Joerren | 174/28 X |
| 4,602,763 | 7/1986 | Gayin | 254/134.3 FT |
| 4,793,594 | 12/1988 | Kumpf | 254/134.3 FT |
| 5,029,815 | 7/1991 | Kumpf | 254/134.3 FT |
| 5,074,527 | 12/1991 | Kumpf | 254/134.3 FT |
| 5,121,644 | 6/1992 | Grey et al. | 254/134.4 |
| 5,442,136 | 8/1995 | Allen | 174/95 |

FOREIGN PATENT DOCUMENTS

| | | | |
|---|---|---|---|
| 1023405 | 3/1953 | France | 174/28 |
| 2127274 | 11/1979 | Germany | 174/28 |
| 3731611 | 3/1989 | Germany | 254/134.3 FT |
| 1-164208 | 6/1989 | Japan | 254/134.3 R |
| 4-91607 | 3/1992 | Japan | 254/134.3 R |
| 487578 | 6/1938 | United Kingdom | 174/28 |

OTHER PUBLICATIONS

Vikimatic OCCU–DUCT Brochure, ©1989, Vikimatic Sales Inc.
Vikimatic Zero Tension Brochure, ©1988, Vikimatic Sales Inc.
FODUCT Brochure, ©1991 Aeroquip Corporation.

*Primary Examiner*—Hyung-Sub Sough
*Attorney, Agent, or Firm*—Renner, Kenner, Greive, Bobak, Taylor & Weber

[57] ABSTRACT

A flexible partitioning device (10) for a tubular conduit (11) includes an elongate web member (22) which can be provided with a plurality of notches (32) spaced substantially regularly along its length to permit multiplanar articulation thereof. The web member (22) may also be provided with a longitudinally extending strength member (20) and may also include at least one bore (50) in which may be positioned a transmissive element (51). The partitioning device (10) may be connected to a duct rodder (61) and pushed through the conduit (11) or alternatively, the duct rodder (61) can be attached to a paddle (64) which is pushed through the conduit (11). Then, the partitioning device (10) is attached to the duct rodder (61) and pulled back through the conduit (11). To assist in pushing the rodder (61) through the conduit (11), an air moving device (73, 76) may be attached to one of the ends of the conduit to move air in the same direction of travel as the rodder (61). The partitioning device (10) may also be pulled through conduit (11) by a rope (42) wherein device (10) has apertures (81) for receiving ropes (82) or cables (86). As the partitioning device (10) is pulled, ropes (82) and/or cables (86) are also pulled through conduit (11). Then, a cable can be attached to rope (82) and pulled back through an appropriate chamber of conduit (11).

9 Claims, 7 Drawing Sheets

PARTITIONING DEVICE FOR A TUBULAR CONDUIT AND METHOD OF INSTALLATION THEREOF

CROSS REFERENCE TO RELATED APPLICATIONS

This is a continuation-in-part of application Ser. No. 08/136,167 filed Oct. 15, 1993, now U.S. Pat. No. 5,442,136, which is a division of application Ser. No. 07/907,594 filed Jul. 2, 1992 and now abandoned.

TECHNICAL FIELD

The present invention generally relates to tubular conduit of the type that might be employed for the housing of underground cables, such as fiber optic cable, coaxial cable, or the like. More particularly, the present invention relates to a partitioning device which may be inserted into such a conduit such that the conduit is divided into separate areas. Specifically, the present invention is directed toward an elongate partitioning device which is flexible, such that it may be inserted into a conduit which is already in place, which may already have at least cable positioned therein, and which may have turns, bends, or the like therein.

BACKGROUND ART

Cable, such as fiber optic communication cable, is often provided underground in great lengths, and may even extend for many miles. It is known in the art to bury the cable in the ground so that the area above ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable in the ground. The conduit is often formed from lengths of polyvinyl chloride tubing or the like, which is laid in the ground. A rope is then blown through the conduit, and the rope in turn is attached to one end of the communication cable. By pulling the rope, the cable is drawn through the conduit. Once in place within the conduit, the cable is protected from damage which may be caused by weather, water and the like.

It has been found that certain rodents will sometimes gnaw through an underground conduit. Hence, much underground conduit is employed which has a diameter of two inches or more, which is large enough to impede damage from most rodents. While such conduit provides excellent protection for communication cable, there is also much unused or "dead" space within such a conduit. With the advent of fiber optic cables, which may be only a half-inch or less in diameter, there is even more dead space within an average conduit.

After a conduit is in place, it may be subsequently desired to run a second communication cable at the same location. As such, it would be desirable from a cost and time standpoint to make use of the dead space within an existing conduit, rather than lay a new length of conduit. However, it has been found that it is difficult to merely insert a second cable into a conduit which already contains a first cable. When a rope is blown into a conduit already containing a cable, or a second cable is "snaked" through the conduit, they are often impeded by the first cable, making it impossible to insert the second cable.

It has been suggested to provide a divider to be inserted into a conduit in order to separate the conduit into discrete sections, thus making insertion of the second cable easier. A problem has been encountered in that when conduit is placed over long distances, undulations will invariably occur therein. Also, planned curves, such as at underpasses or the like, will often be encountered rendering the placement of known dividers therein difficult, if not impossible.

A need exists therefore for a device to separate or partition a conduit, such as an underground communication cable conduit, into discrete sections. The device must be capable of being inserted into a conduit that is already in place, which may undulate over many miles, and which may have sharp turns therein. A need also exists for a partitioning device which will provide for improved use of the space within a conduit.

DISCLOSURE OF THE INVENTION

It is therefore an object of the present invention to provide a device for the sectioning or dividing of a conduit.

It is another object of the present invention to provide a device, as above, which may be inserted into a conduit that extends for great lengths.

It is yet another object of the present invention to provide a device, as above, which can be inserted into a conduit even if one or more cables or the like are already in place in the conduit.

It is still another object of the present invention to provide a device, as above, which may be inserted into a conduit and partition the conduit into discrete sections, despite undulations, turns or bends in the conduit.

It is a further object of the present invention to provide a device, as above, which will provide for improved use of the space within a conduit.

It is an additional object of the present invention to provide a device, as above, which itself can carry transmissive elements.

It is a still further object of the present invention to provide a method for inserting a device according to the present invention into a conduit.

It is another object of the present invention to provide a system which permits the utilization of pressurized air to assist insertion of the partitioning device into a conduit.

It is still another object of the present invention to provide a method for inserting a device which employs pressurized air.

It is yet another object of the present invention to provide a system which simultaneously inserts a partitioning device and ropes for pulling cable through the newly created chambers.

It is a further object of the present invention to provide a method for simultaneously inserting a partitioning device and ropes for pulling cable through the newly created chambers.

At least one or more of the foregoing objects, together with the advantages thereof over the known art relating to conduits, which shall become apparent from the specification which follows, are accomplished by the invention as hereinafter described and claimed.

In general, the present invention provides a system for preparing a longitudinal conduit to receive a partitioning device by employing a paddle with a pushing member attached thereto. The paddle is pushed through the entire length of the conduit, which pushing may be assisted by moving air. The paddle may then be detached from the pushing member so that a partition device may be attached thereto. The pushing member, with attached partition device, is then pulled back through the conduit to form chambers therein.

The moving air may be provided by a blower attached to one end of the conduit to force air through the conduit in the same direction as the paddle. An air catching device is connected to the paddle to utilize the air pressure within the conduit to assist movement of the paddle. Alternatively, instead of employing a blower at one end, a vacuum source can be disposed at the end opposite the end of the conduit where the paddle is inserted. Therefore, in a similar manner, moving air assists the pushing member in moving the paddle through the conduit.

In situations where a pulling rope is pre-installed within a longitudinal conduit or has already been blown into the conduit, the pulling rope can be employed to pull a partitioning device therein to form longitudinally extending chambers. To assist in pulling cables into the newly formed chambers, the partitioning device has apertures therethrough so that selected combinations of a cable or pulling ropes can be secured thereto and simultaneously pulled into the appropriate chamber.

A number of alternative embodiments of partitioning devices incorporating the concepts of the present invention are shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
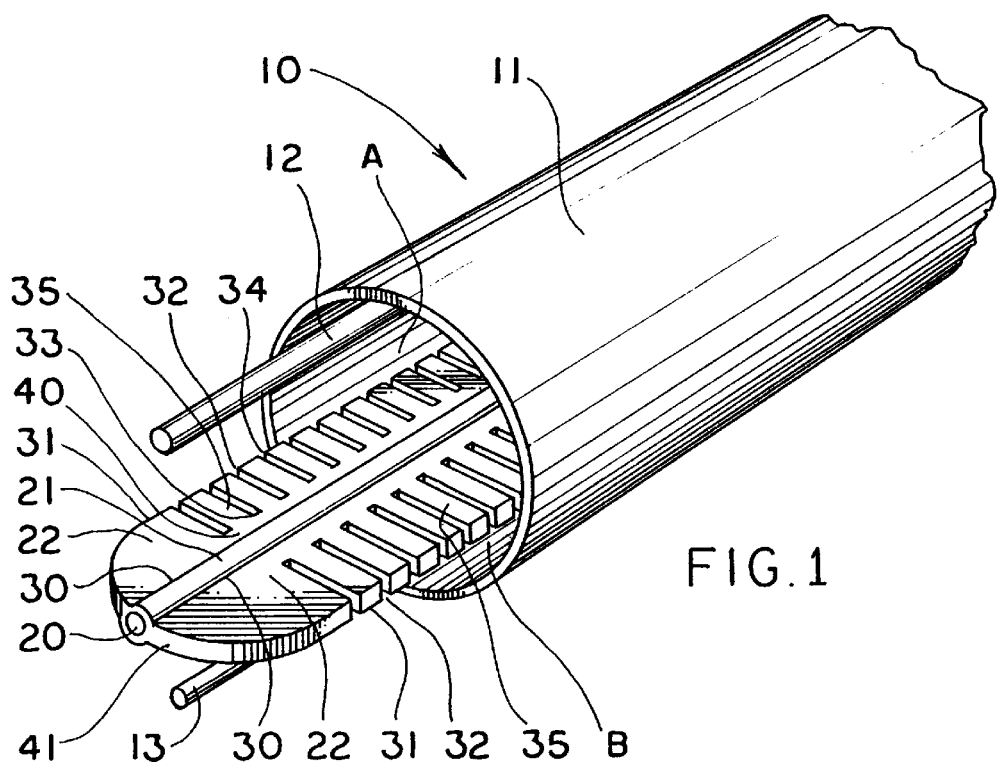
FIG. 1 is a perspective, fragmented view of a device made in accordance with one embodiment of the present invention, shown environmentally within a section of a cable conduit.

One embodiment of a partitioning device embodying the concepts of the present invention is generally indicated by the numeral 10 in the drawings. Partitioning device 10 is shown in FIG. 1 in place within a section of conduit 11. While conduit 11 as depicted in the drawings is of the type used to house underground cable, such as optical cables 12 and 13, it will be appreciated that partitioning device 10 has application to any tubular conduit in which it is desired to be partitioned or divided into discrete sections. Furthermore, by "partitioning" or the like, it is understood to mean the separation of the conduit into discrete or individual longitudinal sections. For example, conduit 11 in FIG. 1 is partitioned by partitioning device 10 into discrete sections A and B.

As will be more fully discussed hereinbelow, partitioning device 10 may include a flexible, elongate strength member 20, a bead 21 covering strength member 20, and a rigid elongate web member 22 extending laterally from an area proximate to bead 21 and strength member 20. Long lengths of partitioning device 10 can be placed within a conduit 11, such as up to several thousand feet or more at a time.

Partitioning device 10 may be provided with any number of web members 22, depending upon how many separate longitudinal sections into which it is desired to separate the interior of conduit 11. Preferably, partitioning device 10 is provided with two web members 22, as depicted in the drawings, which laterally extend from an area proximate to strength member 20 in substantially the same plane. Of course, web members 22 need not necessarily extend in the same plane to partition conduit 11.

Preferably, the width of web members 22 is such that the combined width of two such members extending in the same plane (FIG. 1), is slightly less than the inside diameter of conduit 20, preferably extending to a width of at least approximately 80 percent of the inside diameter of conduit 11. For example, when employed to partition a conduit 11 having an inside diameter of 4 inches, partitioning device 10 may have a width of from about 3.5 to about 3.8 inches. The actual width of web members 22 will vary depending upon the end use application, and it is within the scope of the present invention to provide a partitioning device 10 with a width the same as or even larger than the inside diameter of conduit 11, if appropriate.

By providing web members 22 such that partitioning device 10 has an overall width only slightly less than the inside diameter of conduit 11, as is depicted in the drawings, conduit 11 is separated into two substantially equal sections by area, A and B. While the equality of sections A and B by area is not an absolute limitation of the invention, it is nevertheless preferred. An existing cable within conduit 11, for example, cable 12 will always remain in one section, such as section A, when partitioning device 10 is being positioned in conduit 11. Then another cable, such as cable 13, may be positioned in the other area, section B.

Strength member 20 provides support for partitioning device 10, so that partitioning device 10 can more readily be pulled or pushed through long lengths of conduit 11. While the material of construction of strength member 20 is not an absolute limitation of the present invention, it is preferred that steel, fiberglass or the like be employed.

Figure 6:
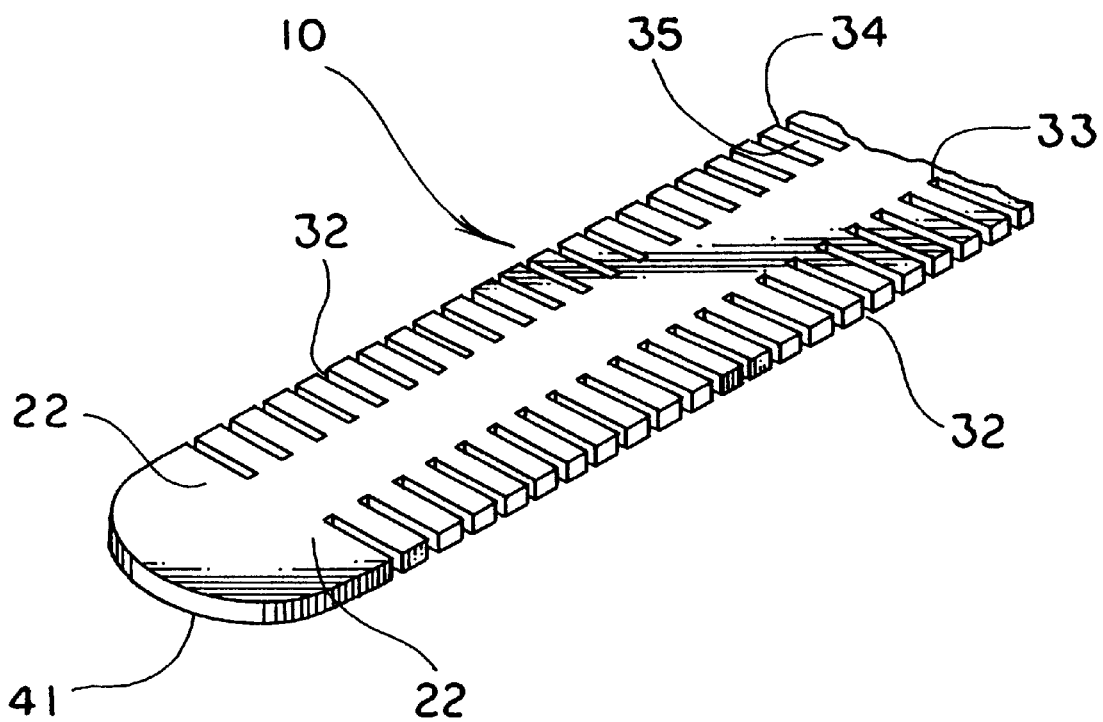
FIG. 6 is a fragmented perspective view of an alternative embodiment of the device of the present invention.

As will be appreciated by one skilled in the art, and as will be more fully discussed hereinbelow, by properly selecting the type of material from which to fabricate strength member 20, if it is employed, and by taking into account its diameter and length, the amount of flexibility of strength member 20 may be varied. For example, if partitioning device 10 is to be employed to partition a relatively straight conduit 11, and only undulations caused by the long lengths may have to be accommodated when installing partitioning device 10 therein, strength member 20 may not be necessary. Such is shown, for example, in the embodiments of partitioning device 10 depicted in FIGS. 6, 8 and 9. If a strength member 20 is provided in applications involving a relatively straight conduit 11, it may be relatively stiff, such as one made from steel. Conversely, if conduit 11 to be partitioned is known to have bends, turns, elbows or the like, a strength member 20 may be provided which is somewhat more flexible, such as when fabricated from certain fiberglass, composites or the like. The greater flexibility will allow partitioning device 10 to negotiate the sharper turns within conduit 11.

It is preferred to form web members 22 from one piece of plastic material, such as by extruding polyethylene or the like. If strength member 20 is employed, then webs 22 may be extruded therewith. Furthermore, strength member 20 may be covered by bead 21 during such an extrusion process. Thus, each web member 22 has a first lengthwise edge 30 proximate to strength member 20, and a second lengthwise edge 31 distal thereto.

In conduit environments where bends and turns are expected, a plurality of notches 32 may be provided which open into or intersect second lengthwise edge 31 of each web member 22. Notches 32 are preferably substantially regularly spaced along each web member 22, and are of sufficient depth to permit web members 22 to flex with strength member 20. Notches 32 need not be evenly spaced, but rather a sufficient number of notches 32 are provided to ensure proper multiplanar articulation of partitioning device 10 as shown in FIG. 2.

Figure 2:
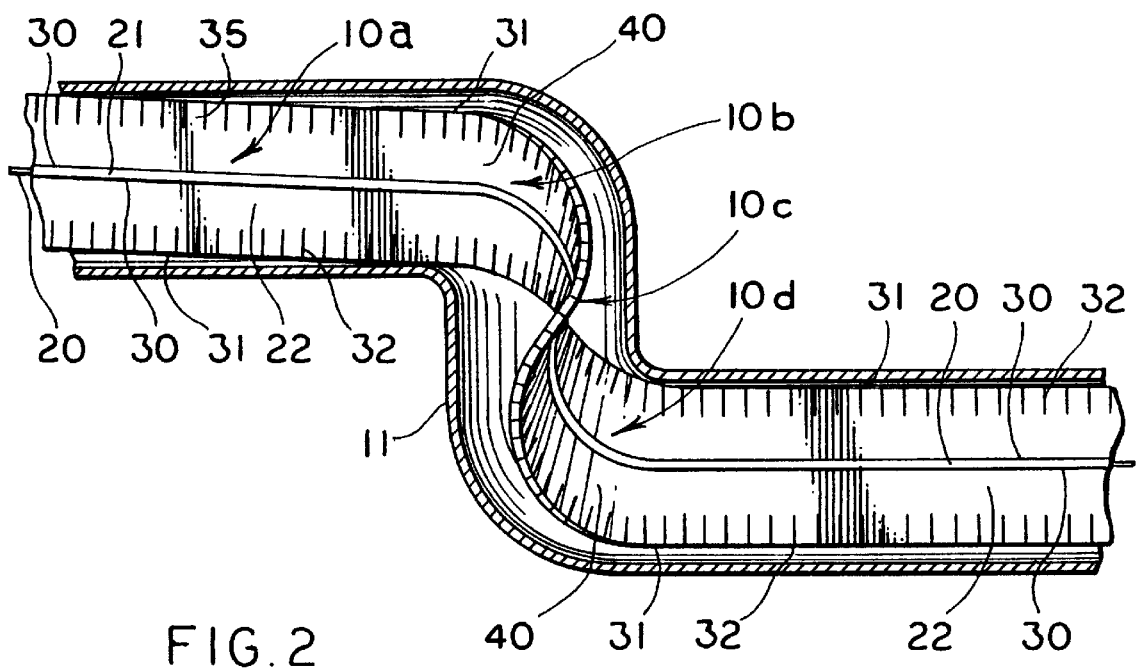
FIG. 2 is a side elevational, cross sectional, fragmented, somewhat schematic view of the device shown in FIG. 1 positioned within a section of winding conduit.
Figure 3:
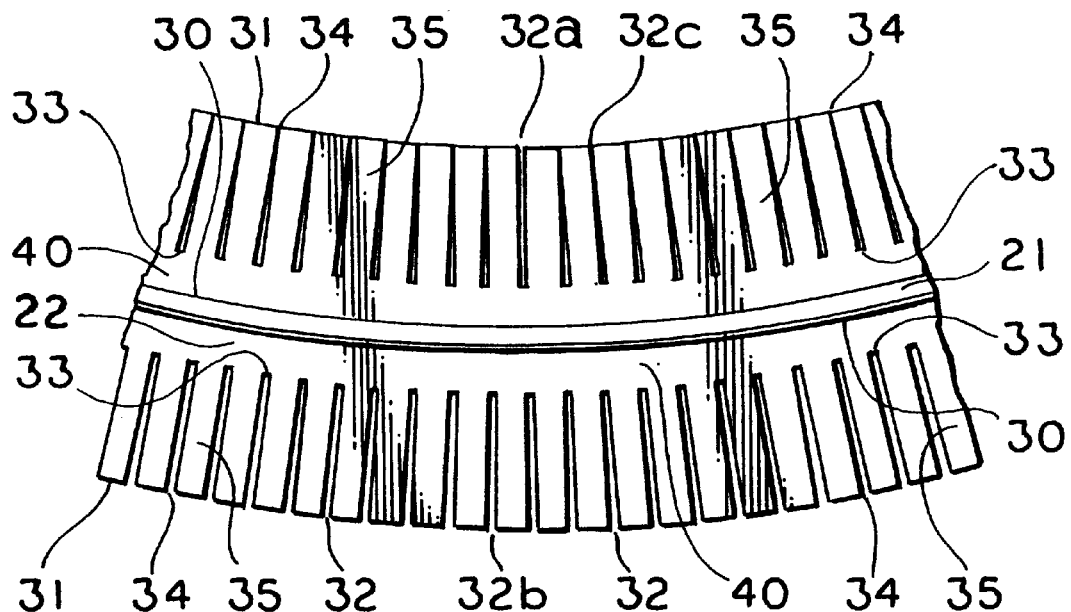
FIG. 3 is a fragmented plan view of the device of FIG. 1 shown in a fixed configuration.

In order to permit such flexing as depicted in FIG. 2, as shown in FIG. 3, each notch 32 has an end 33 proximate to bead 21, and an open end 34 distal thereto and intersecting second lengthwise edge 31. Ends 33 and 34 are separated by wall portions 35. By providing wall portions 35 of a preselected length, that is, by providing notches 32 having a preselected depth, notches 32 allow partitioning device 10 to attain a degree of multiplanar flexibility. More particularly, by virtue of notches 32, partitioning device 10 will be capable of articulating in more than one plane without the material of partitioning device 10 cracking or splitting. As shown in FIG. 3, which is a top plan view of partitioning device 10 depicting a portion of partitioning device 10 articulated in one plane, the articulation causes partitioning device 10 to form an arc. The wall portions 35 proximate to end 34 of a notch, such as notch 32a on a web member 22 on the inside radius of the arc formed by the articulated partitioning device 10, are closer together than the wall portions 35 proximate to end 34 of a notch such as notch 32b on the outside radius of the arc formed by the articulated partitioning device 10. In certain instances of more severe articulation, the wall portions 35 proximate to end 34 of a given notch 32, such as notch 32c, may actually touch, as is depicted in FIG. 3.

Figure 4:
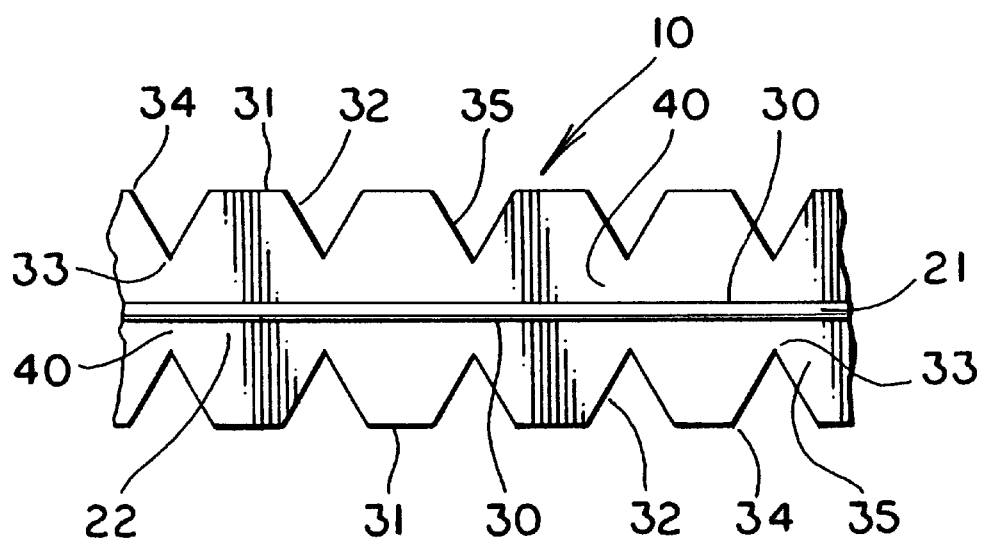
FIG. 4 is a fragmented plan view of another embodiment of the device of the present invention.

The length of wall portions 35 of a given notch 32 directly affects the ability of partitioning device 10 to articulate in one plane. The length of such a wall portion 35 will vary depending upon the degree of flexibility required and the actual material employed to fabricate partitioning device 10. As an example, when the partitioning device 10 is fabricated from a polyethylene material, and when the width of the device is about 2 inches, the length of wall portions 35, that is the "depth" of notches 32, may vary from about 0.5 to about 0.75 inches. This will vary the amount of material 40 between bead 21 and end 33 of each notch 32. Furthermore, notches 32 may be of any configuration, such as rectangular as depicted in the FIGS. 1, 2, 3, 6 and 7, V-shaped as in the embodiment of FIG. 4, or the like as may be desired or necessary to accommodate a particular conduit environment.

As previously indicated and as shown in FIG. 2, partitioning device 10 is capable of articulation in multiplanes. Partitioning device 10 actually rotates when accommodating such turns, by virtue of its flexibility. For example, in FIG. 2, a portion 10a of partitioning device 10 is shown as a top plan view, which when conduit 11 turns downwardly articulates in the area approximated by the numeral 10b, such that the portion 10c is depicted as a side or edge view. A further turning of conduit 11 causes device 10 to further turn, as at 10d, and again appear in plan view in FIG. 2.

It is preferred, to assist in the positioning of partitioning device 10 within conduit 11, to provide a rounded off leading edge 41 of web members 22. This provides a wedge effect when partitioning device 10 is pulled or pushed through conduit 11. Such is particularly helpful when the conduit 11 which is being divided by device 10 already has one or more cables, such as 12 or 13, positioned therein. Leading edge 41 will thereby push such a cable into area A or B of conduit 11.

Figure 7:
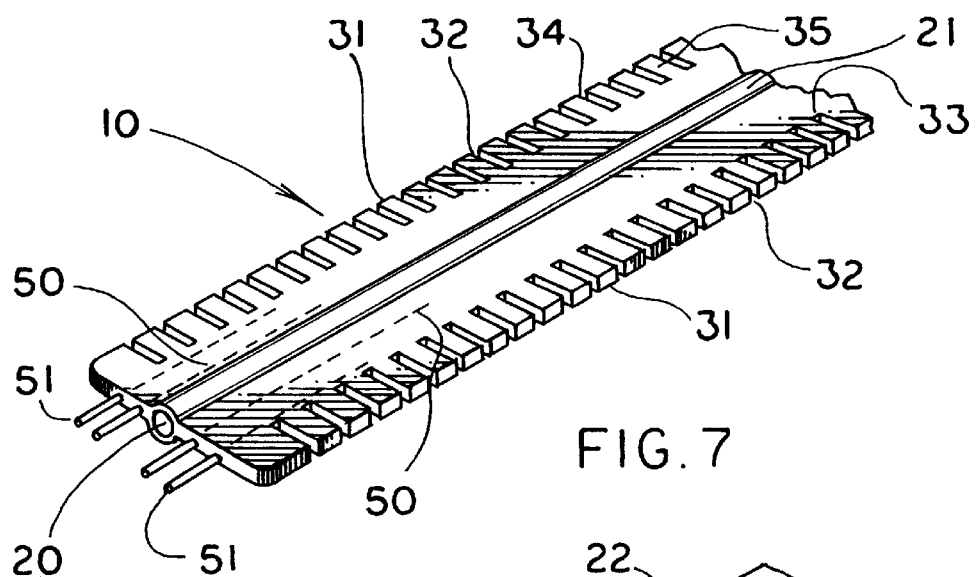
FIG. 7 is a fragmented perspective view of another alternative embodiment of the device of the present invention.

In another embodiment of the present invention, as depicted in FIG. 7, partitioning device 10 can be provided with a plurality of longitudinal bores 50 shown partially in phantom lines, preferably regularly spaced and generally parallel to one another and to strength member 20 if the same is employed. Bores 50 have a diameter sufficient for one or more transmissive elements or wires 51, which may be extruded or fabricated with partitioning device 10 or otherwise positioned within bores 50. It will be appreciated that wires 51 may be conductive wires, fiber optic strands or the like, without limitation. The presence of wires 51 thus provide the added advantage of increasing the carrying capacity within a conduit 11, by not only dividing the conduit 11 into discrete sections, but also utilizing partitioning device 10 itself to carry additional conductive and/or transmissive elements therein.

Figure 8:
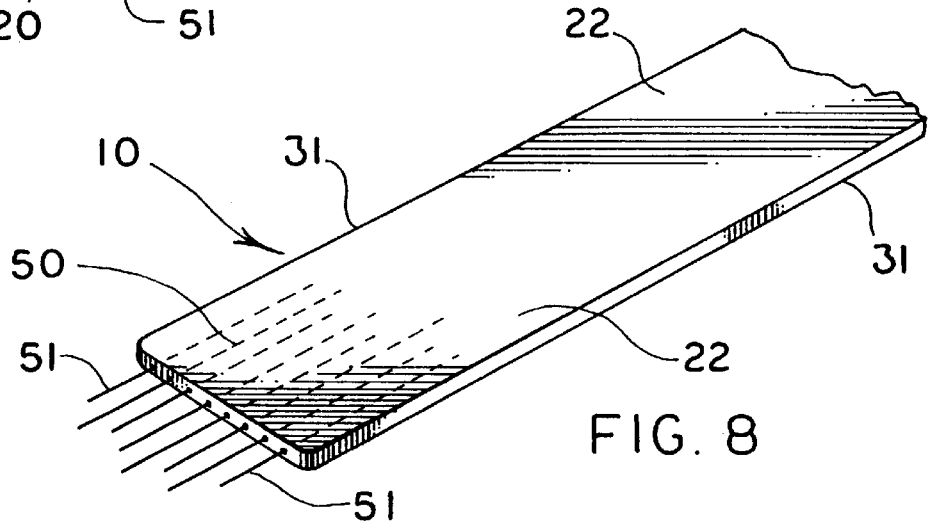
FIG. 8 is a fragmented perspective view of another alternative embodiment of the device of the present invention.
Figure 9:
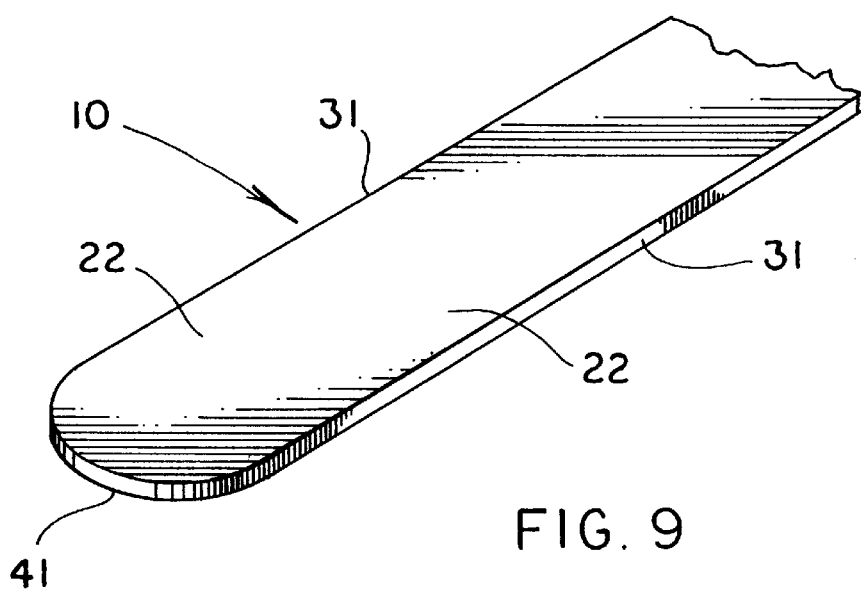
FIG. 9 is a fragmented perspective view of another alternative embodiment of the device of the present invention.

In circumstances involving lengths of conduit 11 which do not have sharp turns, bends or the like, the embodiment of FIG. 8 may be employed. There, a partitioning device 10 is provided which does not have a strength member 20 nor notches 32 in web member 22. Partitioning device 10 of FIG. 8 thus can be provided with a larger multiplicity of bores 50 and wires 51, that is, more than that which can be provided in the embodiment of FIG. 7. Thus, not only is the division of a conduit 11 into sections A and B accomplished, but also the flexibility of transmitting many more wires through the device 10 itself is provided, thereby utilizing device 10 to its full advantage. Even without notches 32, strength member 20 or bores 50, a partitioning device such as shown in the embodiment of FIG. 9 can be utilized to divide short lengths of relatively straight conduit in accordance with this invention.

In certain applications involving short and generally straight conduits, partitioning device 10 may be directly pushed through a conduit as by mechanically grasping strength member 20 and pushing device 10 through the conduit. For more difficult applications partitioning device 10 may be positioned within a conduit 11 as shown for example, in FIG. 5. There a rope or line 42 may be affixed to partitioning device 10, such that once partitioning device 10 is positioned within conduit 11, as by known blowing routines, rope 42 may be employed to pull a cable, such as cables 12 or 13 (FIG. 1) back through conduit 11. Any means may be employed to affix rope 42 to partitioning device 10, such as by a swivel connector 43 affixed to partitioning device 10 by a bolt 44.

Figure 5:
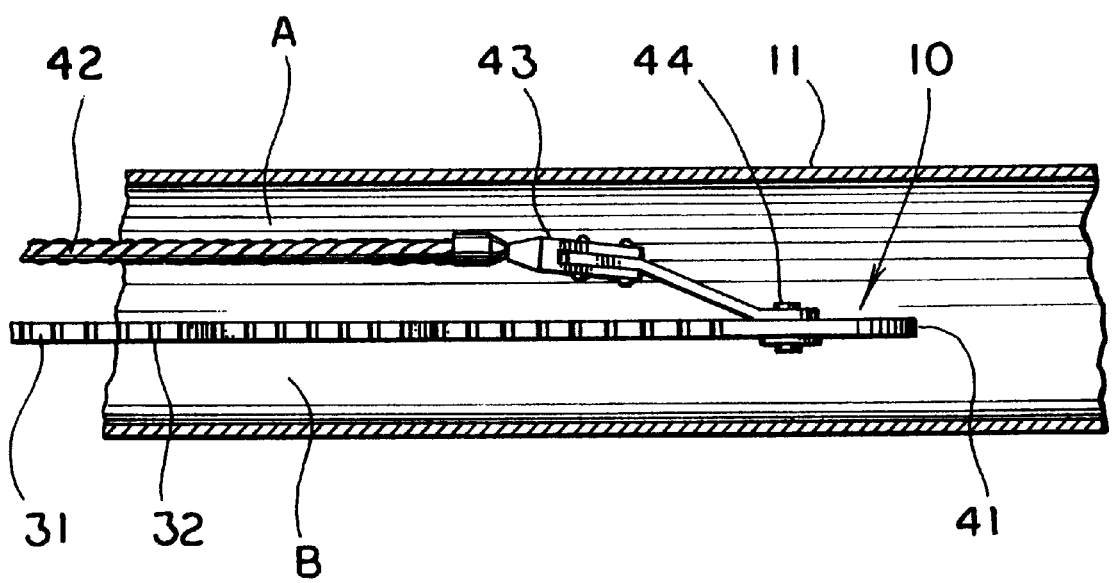
FIG. 5 is fragmented plan view showing one method by which a device of the present invention is inserted into a conduit.
Figure 10:
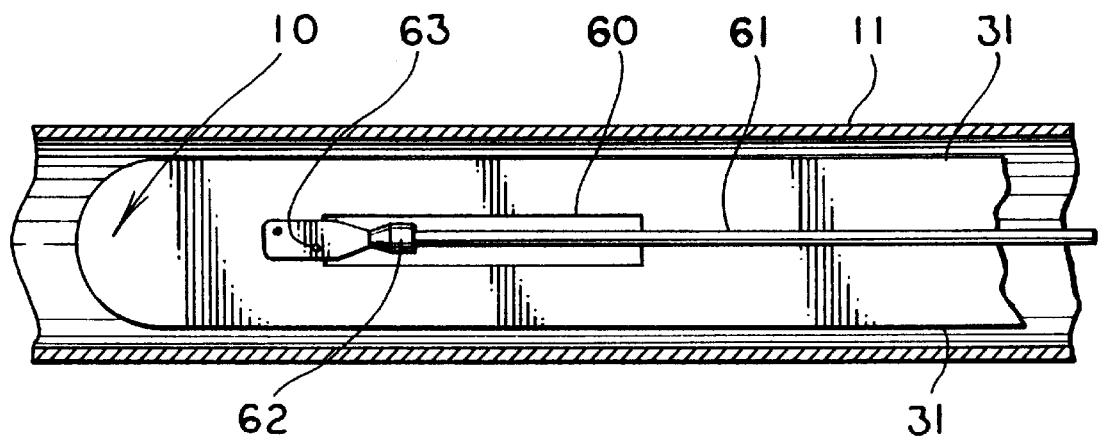
FIG. 10 is a fragmented plan view showing another method by which a device of the present invention may be inserted into conduit.
Figure 11:
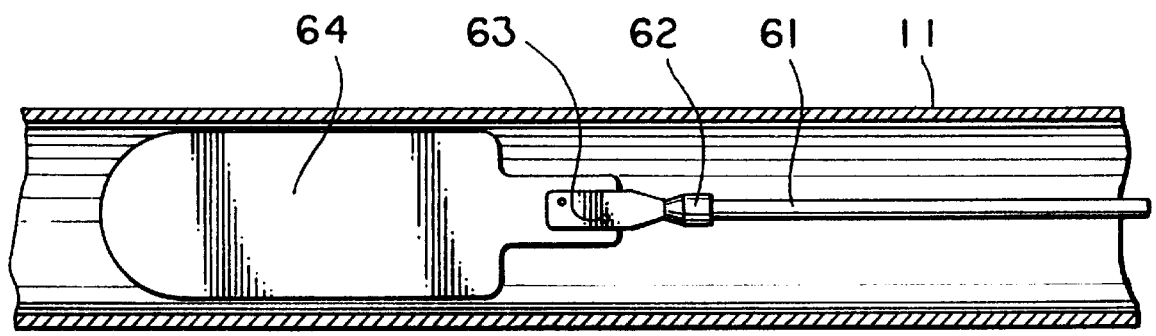
FIG. 11 is a fragmented plan view showing yet another method by which a device of the present invention may be inserted into a conduit.

Additional manners in which to insert any of the embodiments of partitioning devices 10 disclosed herein are shown in FIGS. 10 and 11. Instead of blowing partitioning device 10 in with a rope, as shown in FIG. 5, for more difficult applications, that is, those involving conduits 11 having several turns therein or of significant length, a notch 60 may be cut generally into the center of partitioning device 10. A conventional duct rodder 61 may then be attached to partitioning device 10 at the area of notch 60, as by a swivel connector 62 bolted to device 10 at one end of notch 60, as at 63. Duct rodder 61 is then pushed through conduit 11 and, of course, carries partitioning device 10 with it. At the end of the run of conduit 11 to be divided by partitioning device 10, duct rodder 61 can then be removed from device 10 and a rope attached thereto. Retracting duct rodder 61 thus pulls the rope back to the beginning of conduit 11 and the rope can then be used to pull a cable into one of the sections formed in conduit 11 by divider 10. Thus, one simple extension and retraction of the duct rodder accomplishes two functions, that is, the dividing of the conduit and the pulling of the rope needed to insert the cable.

For the most difficult of applications, that is where extreme bends are to be encountered in a conduit 11, and where divider 10 may not be able to be pushed through such a conduit, the method depicted in FIG. 11 may be employed. There, duct rodder 61 is attached, as by swivel 62 and bolts 63, to a paddle 64 and pushed (to the left in FIG. 11) through conduit 11. Because paddle 64 is a short member, as opposed to the long partitioning device 10, it may be more readily pushed through a difficult conduit environment than the partitioning device 10. When reaching the end of the run of conduit 11 to be divided, paddle 64 is removed and a partitioning device 10, such as shown in FIG. 10, is then attached to duct rodder 11. Then rodder 61 merely pulls device 10, a much easier operation than pushing, back through conduit 11 to partition the same. Optionally, when device 10 is being pulled back by rodder 11, a rope may be attached thereto so that it is already in place to pull a cable through the conduit without the need to blow the rope into position.

Figure 12:
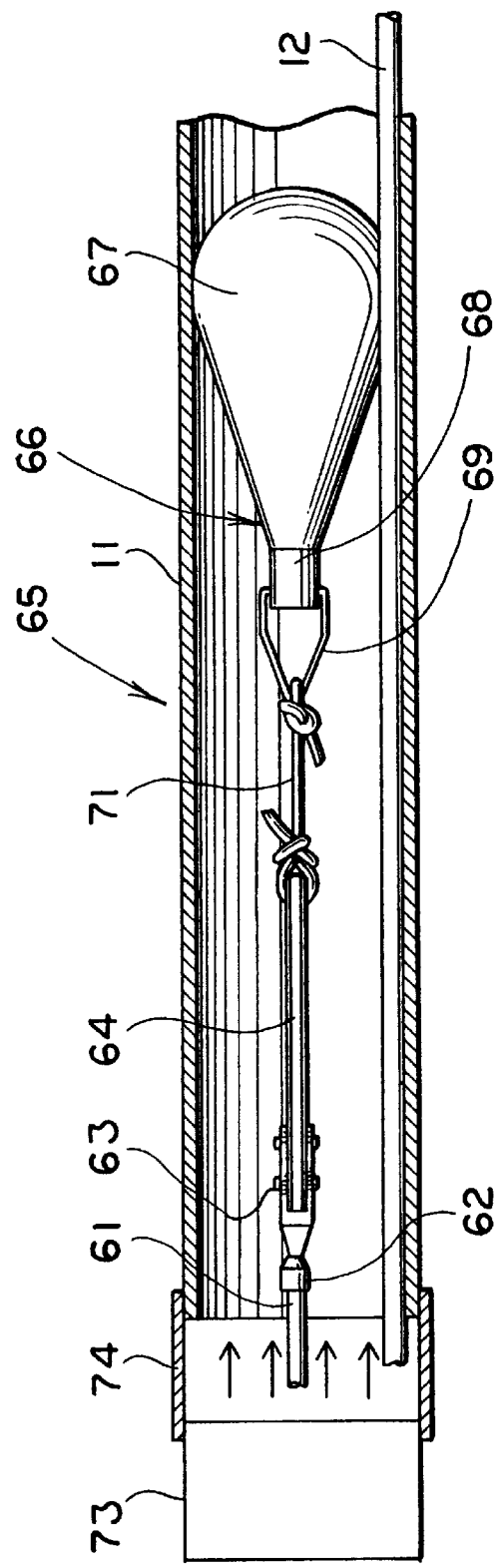
FIG. 12 is a fragmented plan view showing a method by which a conduit may be prepared to receive a partitioning device.

A system to prepare a conduit 11 to receive a partitioning device 10 is generally indicated by the numeral 65 as illustrated in FIG. 12. This system is particularly suited for situations where, as shown, a cable 12 is already positioned in conduit 11. As before, duct rodder 61 is attached to paddle 64 by swivel 62 and bolts 63 and pushed (to the right in FIG. 12) through conduit 11. To further assist the movement of paddle 64, an air catching device 66 is secured to the end of paddle 64 opposite the end attached to rodder 61. In particular, air catching device 66 has an inflatable portion 67 with an open end secured around a collar 68. A clip 69 is carried by collar 68, with an interconnecting rope 71 having one end fastened to clip 69 and its other end fastened to paddle 64. A blower 73, with an interconnecting seal 74, is disposed around the end of conduit 11 where rodder 61 is being pushed. As blower 73 forces and moves air through conduit 11, air flows through collar 68 and into inflatable portion 67. Inflatable portion 67 fills and expands into the open spaces within conduit 11 to increase air pressure therein. By pressurizing conduit 11, paddle 64 is more easily moved from one end of conduit 11 to the other end. At the end of the run of conduit 11, blower 73 is turned off and paddle 64 and air catching device 66 are removed from rodder 61 to allow for attachment of a partitioning device 10, such as shown in FIG. 10. As described earlier, rodder 61 can then be utilized to pull device 10 back through conduit 11, and if desired, to pull a rope for the eventual pulling of another cable through the newly partitioned portion of conduit 11.

Figure 13:
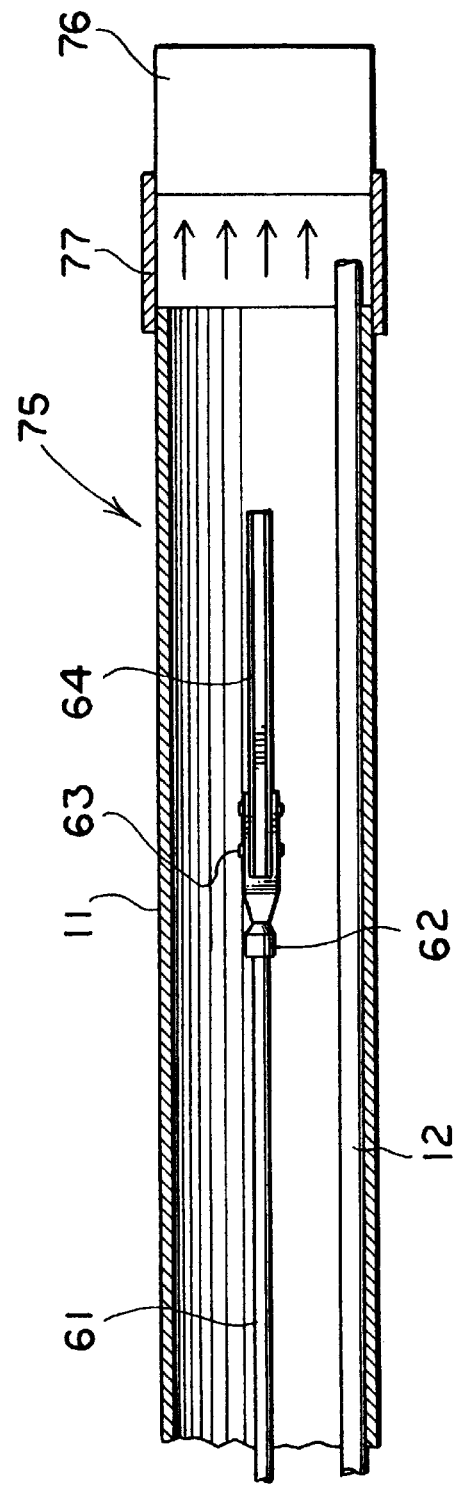
FIG. 13 is a fragmented plan view showing another method by which a conduit may be prepared to receive a partitioning device.

Still another embodiment to assist the insertion of rodder 61 into conduit 11 is generally indicated by the numeral 75 illustrated in FIG. 13. As before, duct rodder 61 is attached to paddle 64 by swivel 62 and bolts 63 and pushed (to the right in FIG. 13) through conduit 11. To further assist the movement of paddle 64, a vacuum source 76 with an interconnecting seal 77, is disposed around the end of conduit 11 opposite the end of conduit 11 from where rodder 61 is being pushed. As vacuum 76 draws air through conduit 11, movement of paddle 64, along with rodder 61, is assisted accordingly. The interconnecting seal 77 maximizes the intake force of vacuum 76. As such, paddle 64 is easily moved from one end of conduit 11 to another. Once received at the opposite end of conduit 11, vacuum 76 is turned off and paddle 64 is detached from rodder 61 so that a partitioning device 10, as shown in FIG. 10, can be attached thereto. As before, rodder 61 can then be utilized to pull device 10 back through conduit 11 and, if desired, to pull a rope for the eventual pulling of another cable through the newly partitioned portion of conduit 11.

Figure 14:
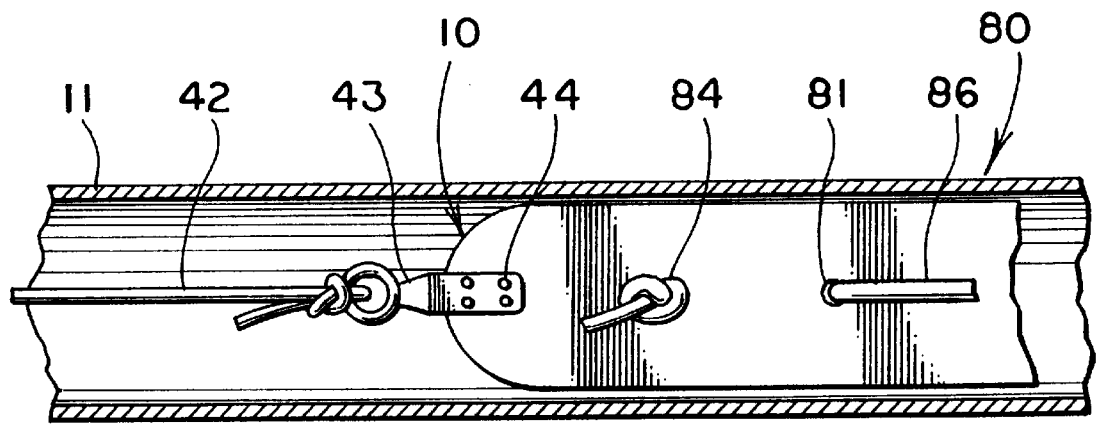
FIG. 14 is a fragmented plan view of a further alternative embodiment by which a device of the present invention may be inserted.
Figure 15:
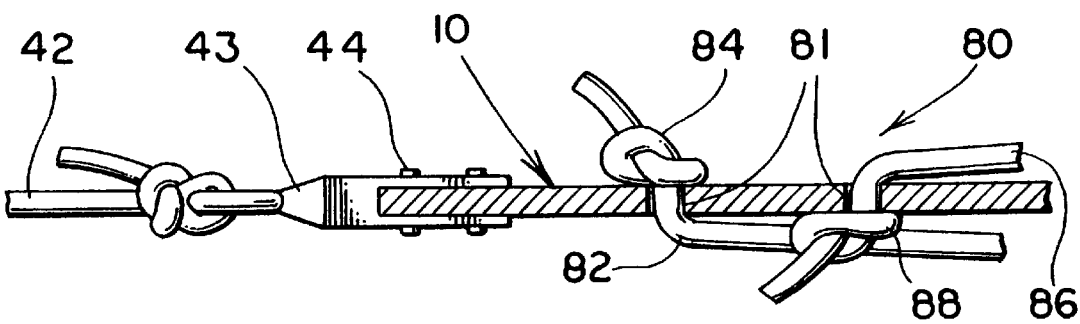
FIG. 15 is a fragmented elevational view, in partial cross-section, of the embodiment of FIG. 14.
Figure 16:
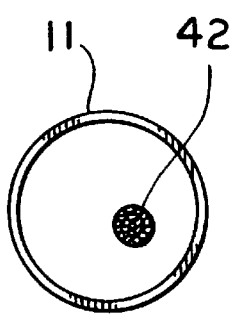
FIG. 16 is an end elevational view of a pulling rope within a conduit prior to installation of a partitioning device of the present invention.

Another system to assist the insertion of cables into a partitioned conduit 11 is generally indicated by the numeral 80 and is illustrated in FIGS. 14 and 15. As seen in FIG. 16, a pulling rope 42 has already been installed in conduit 11. FIGS. 14 and 15 illustrate that pulling rope 42 is detachably secured to a swivel connector 43, which is connected to partitioning device 10 by bolts 44. Of course, any similar means could be used to connect pulling rope 42 to partitioning device 10. Partitioning device 10 may be provided with a plurality of apertures 81 near where pulling rope 42 is connected. A partition rope 82 is detachably mounted to device 10 by inserting one end of rope 82 through aperture 81 and tying a knot 84 at the end thereof. In a similar manner, another rope or a cable 86 could be inserted through another aperture 81 and tied into a knot 88 for detachably mounting to device 10. Of course, any method of connection by increasing the diameter of rope 82 or cable 86 after insertion thereof through apertures 81 could be employed.

Figure 17:
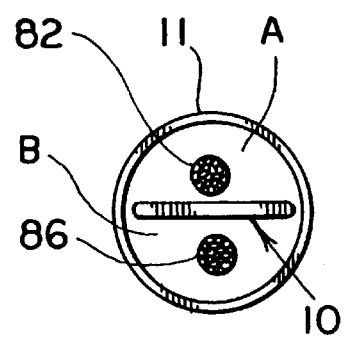
FIG. 17 is an end elevational view of the conduit of FIG. 16 after installation of a partitioning device of the present invention.

In operation, pulling rope 42 is detachably connected to partitioning device 10 to simultaneously pull device 10 and any combination of partition ropes 82 or cables 86 through the conduit 11. As best seen in FIG. 17, as the plurality of longitudinally extending chambers A and B are formed, partition ropes 82 and partitioned cables 86 are automatically received therein at the same time. Once installed, ropes 82 may be employed to pull a cable back through the appropriate chamber. Depending upon the application, the end user may pull any combination of ropes 82 and cables 86 in conjunction with the device 10.

Figure 18:
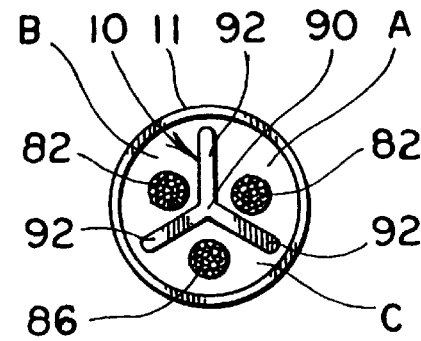
FIG. 18 is an end elevational view of yet another alternative embodiment after installation of a partitioning device of the present invention.

FIG. 18 shows another alternative embodiment where partitioning device 10 has a central core 90 with outwardly extending flanges 92, such that the area between adjacent flanges and conduit 11 forms longitudinally extending chambers A, B and C of substantially equal size. Of course, any number of chambers could be formed depending upon the number of flanges 92 extending from core 90. Flanges 92 each can have apertures 81 for receiving and connecting ropes 82 and/or cables 86 to partitioning device 10 as described in the previous embodiment.

Based upon the foregoing disclosure, it should now be apparent that the use of the partitioning device described herein will carry out the objects set forth hereinabove. It is, therefore, to be understood that any variations evident fall within the scope of the claimed invention and thus, the selection of dimensions, materials of construction and the like can be determined without departing from the spirit of the invention herein disclosed and described. Thus, the scope of the invention shall include all modifications and variations that may fall within the scope of the attached claims.

What is claimed is:

1. A system to prepare a longitudinally extending conduit, having a first end opposite a second end, to receive a partitioning device so that the conduit is adapted to be divided into a plurality of longitudinally extending chambers, the system comprising a paddle; a pushing device detachably mounted to said paddle for pushing said paddle longitudinally in one direction; and means for moving air between the first and second ends of the conduit; whereby the moving air assists said pushing device in pushing said paddle longitudinally in said one direction so that the partitioning device is adapted to be attached to said pushing device and thereafter be received in the conduit.

2. The system as set forth in claim 1, wherein said means for moving air includes a blower to be disposed at said first end for moving air through the conduit; and an air catching device attached to said paddle for catching the air to assist the movement of said paddle through the conduit.

3. The system as set forth in claim 2, wherein said air catching device has an inflatable portion with an open end secured around a collar, and wherein the collar is connected to the end of said paddle opposite of where said pushing device is connected so that the inflatable portion expands as the air is moved to assist the movement of said paddle in the same direction as said pushing device.

4. The system as set forth in claim 1, wherein said means for moving air includes a vacuum source to be disposed at said second end for moving air through the conduit.

5. The system as set forth in claim 1, further comprises a seal interconnect said vacuum source and said second end of the conduit to maximize the intake force of said vacuum source.

6. A method of partitioning a longitudinally extending conduit into a plurality of longitudinally extending chambers, comprising the steps of attaching a paddle to a pushing device; inserting the paddle into one end of the conduit; pushing the paddle longitudinally through the conduit by pushing the pushing device in one direction; moving air from the end of the conduit in which the paddle is inserted to the opposite end of the conduit to assist the pushing of the paddle; detaching the paddle from the pushing device; attaching a partitioning device to the pushing device; and pulling the pushing device longitudinally through the conduit in the opposite direction thereby removing the pushing device from the conduit and leaving the partitioning device in the conduit to partition the conduit into longitudinally extending chambers.

7. The method according to claim 6 wherein the step of moving air includes the steps of disposing a blower at the end of the conduit where the paddle is inserted; and attaching an air catching device to the paddle to assist the movement of the paddle through the conduit.

8. A method according to claim 7 wherein the step of attaching an air catching device includes the steps of providing the air catching device with an inflatable portion that has an open end secured around a collar; and attaching the collar to the paddle, wherein the inflatable portion expands as the air is moved to assist moving the paddle in the same direction as the pushing device.

9. A method according to claim 6 wherein the step of moving air includes the step of drawing a vacuum at the opposite end of the conduit to assist the movement of the paddle through the conduit.

* * * * *